United States Patent [19]

Hiroshima et al.

[11] Patent Number: 5,052,014
[45] Date of Patent: Sep. 24, 1991

[54] GAS LASER TUBE WITH MASK

[75] Inventors: Masaaki Hiroshima; Yoshio Nakazawa, both of Tokyo, Japan

[73] Assignee: NEC Corporation, Japan

[21] Appl. No.: 485,528

[22] Filed: Feb. 27, 1990

[30] Foreign Application Priority Data

Feb. 27, 1989 [JP] Japan ............................... 22620[U]

[51] Int. Cl.$^5$ ............................................. H01S 3/08
[52] U.S. Cl. ..................................... 372/103; 372/99; 372/107; 372/108
[58] Field of Search ...................... 372/103, 92, 61, 65, 372/55, 98, 99, 107, 108

[56] References Cited

U.S. PATENT DOCUMENTS 4,569,053  2/1986  Roullard, III et al. ............. 372/103
4,890,296  12/1989  Crosby .................................. 372/103

FOREIGN PATENT DOCUMENTS 0276387  12/1986  Japan .................................. 372/103
0076580  4/1987  Japan .................................. 372/103

Primary Examiner—Léon Scott, Jr.
Attorney, Agent, or Firm—Leydig, Voit & Mayer

[57]  ABSTRACT

The gas laser tube has a cap-shaped mask attached to the outer surface of an output mirror portion. The mask has an aperture or a window on the bottom thereof to pass a laser beam therethrough. The mask can be rotated around the laser optical axis. The center position of the aperture is located so as to deviate from the rotational center of the mask. Therefore, even when the laser output optical axis is deviated from the rotational center of the mask, the laser beam may easily be adjusted to position within the aperture simply by rotating the mask.

6 Claims, 3 Drawing Sheets

FIG. 2A
FIG. 2B
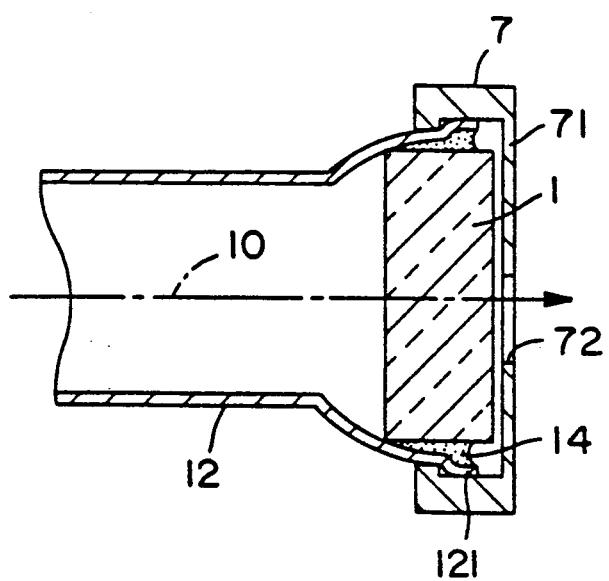
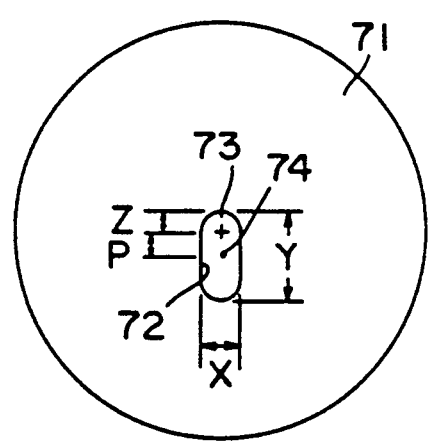

GAS LASER TUBE WITH MASK

BACKGROUND OF THE INVENTION

This invention relates to a gas laser tube and more particularly to an improvement for a laser output mirror portion thereof.

In a gas laser tube, a diameter of an output mirror is generally several ten times as large as the diameter of a laser beam thereon. This is for eliminating the problem of reduced gain in laser oscillation as well as for setting a larger tolerance for assembly errors.

The light outputted from the output mirror is not limited to a coherent light, or laser beam but includes incoherent light generated by gas discharge. Since the incoherent light has no directivity, it is desirable to minimize the incoherent light. The output of such an incoherent light may be reduced by decreasing the diameter of the output mirror, but it could entail such problems as the reduced gain in laser oscillation and difficulties in assembly, and thus such measurement is not practical.

There has not been seen in commercial market to use a mask attached with the output mirror instead of reducing its diameter. This is because optical axes of output mirrors of a plurality of produced gas laser tubes are differently aligned to each other due to assembly errors, and thus it becomes very expensive to manufacture a mask properly aligned to each output mirror. For this reason, there has heretofore been taken no particular countermeasures against such undesirable incoherent light.

SUMMARY OF THE INVENTION

An object of this invention is to provide a gas laser tube equipped with a universal mask which can easily and remarkably reduce unnecessary non-coherent light, thereby enhancing the quality of the emitted beam.

A feature of the gas laser tube according to this invention is in that the exterior surface of the output mirror portion is rotatably mounted with a mask having an accentric window. The mask is shaped like a cap and has on the bottom thereof a window or an aperture for transmitting a laser beam from the output mirror. The aperture is so defined that the center thereof is deviated from the center of the mask in position. It is so designed to fall within the scope of the formulas below wherein the diameter of the laser beam on the output mirror is denoted as d, the minimum dimension of the aperture as X, and the maximum dimension thereof as Y.

$$2d \leq X \leq 4d$$

$$4d \leq Y \leq 5d$$

The minimal distance Z between the center of the mask positioned within the aperture from the aperture end can be expressed as below.

$$d \leq Z \leq 2d$$

In a preferred embodiment of this invention, the cap-shaped mask is formed with an elastic material and has an elliptic aperture on the bottom thereof. The dimension of the opening is determined so that the diameter in the minor axis is about twice the diameter of the laser beam on the output mirror while the diameter in the major axis is about four times the laser beam diameter, and the center of the aperture is deviated from the mask center by a distance equivalent to the laser beam diameter.

BRIEF DESCRIPTION OF THE DRAWINGS

FIG. 2A is a partially enlarged sectional view to show an output mirror portion shown in FIG. 1.

FIG. 2B is a bottom view of a cap-shaped mask shown in FIG. 2A.

DESCRIPTION OF THE PREFERRED EMBODIMENTS

Figure 1:
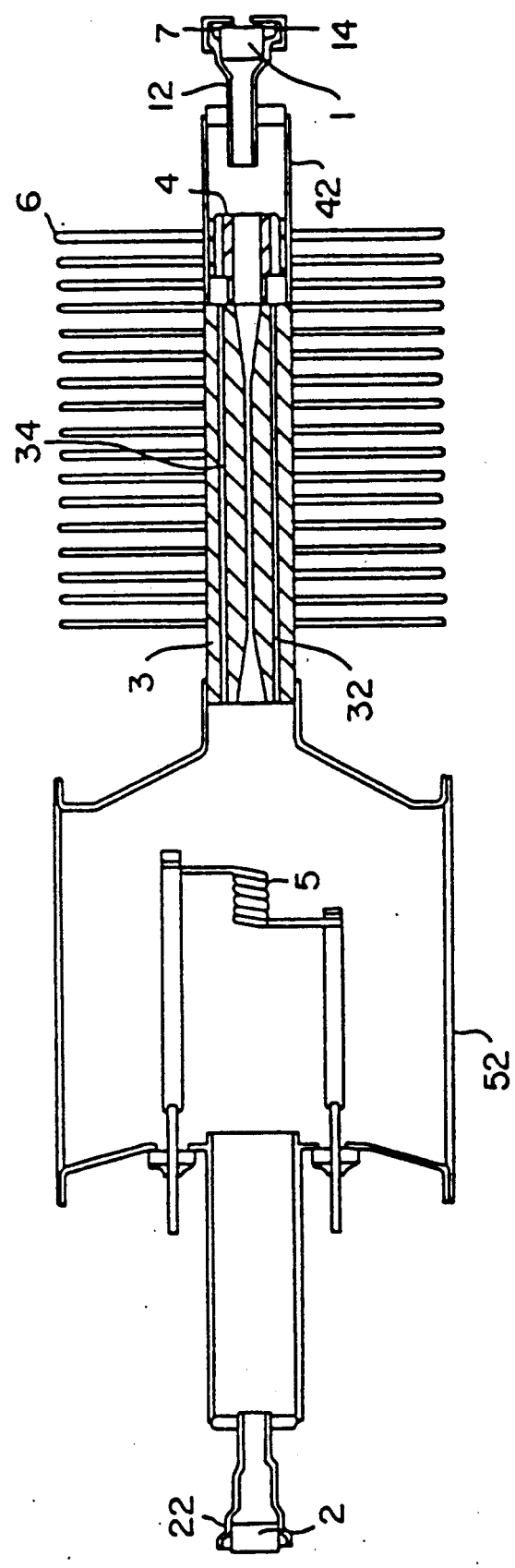
FIG. 1 is a sectional view of an embodiment of a gas laser tube with a mask according to this invention.

FIG. 1 shows a typical example of an air-cooled type argon gas laser tube which has a laser capillary 3 between an output mirror 1 and a total reflection mirror 2. An anode 4 and a cathode 5 are provided on both sides of the capillary 3. The capillary 3 defines a part of the exterior envelope and is sealed with a cylindrical member 52 at one end thereof on the side of the cathode 5. Heat radiation fins 6 are fixed on the outer circumference of the capillary 3 and a return path 32 is formed around a central bore 34. The capillary 3 is sealed on the side of the anode 4 with a cylindrical member 42 which has the anode 4 housed inside. The output mirror 1 and the total reflection mirror 2 are sealed with a sealing member 14 on the internal walls of the cylindrical mirror holders 12 and 22, respectively. A cap-shaped mask 7 is mounted on the outer circumference of the output mirror holder 12. The mask 7 will be described in further detail below.

As shown in FIG. 2A and FIG. 2B, an aperture or an elliptic window 72 is bored on the bottom 71 of the cap-shaped mask 7 or the surface vertical to the laser optical axis 8. The center axis 73 (marked with a cross) or the rotational center axis 73 of the mask is situated within the aperture 72. The central axis 74 (marked with a black point) of the aperture along the optical axis is determined so as to be deviated from the center axis 73 of the mask. The mask central axis 73 is preferably aligned with the central axis of the outer circumferential edge 121 of the mirror holder 12, and substantially with the central axis of the output mirror 1. It is ideal to align the central axis of the cylindrical mirror holder 12 with the central axis of the output mirror as well as with the laser output optical axis 10. However, it is not easy to align the optical axis 10 with the central axis of the mirror holder completely in assembly process. Consequently, it is also difficult to align the position of the laser beams on the output mirror 1 with the central axis 73 of the mask for each of the manufactured laser tubes. This invention solves this problem by causing the cap-shaped mask 7 to rotatably fit with the outer circumferential edge 121 of the mirror holder, and deviating the central axis 74 of the aperture from the central axis 73 of the mask so that the aperture may be adjusted in position to the output laser beam simply by rotating the mask 7. The cap-shaped mask is made of black silicone rubber mixed with carbon powder and has a protruding portion to form a stepped region on the internal side wall thereof to prevent dismounting.

When the laser output beam is oscillated in a basic mode ($TEM_{00}$), 99.97% of the total laser output is concentrated within the scope of the diameter twice as large as the laser beam diameter d in intensity distribution on the beam cross section. The beam diameter d can be defined with the dimension where the intensity at the radius (d/2) of the particular beam becomes $1/e^2$ of the central intensity (e=2.71828 . . . . .). It is empirically known that the laser output optical axis can be easily assembled so as not to be deviated from the central axis of the output mirror by the distance twice the laser beam diameter (2d). Therefore, we can safely assume that, in almost all gas laser tubes, the diviation between the laser output optical axis and the central axis of the output mirror lies within the scope of diameter twice as large as the laser beam diameter on the output mirror. Therefore, if the minor axis X of the elliptical aperture 72 is determined to be twice the beam diameter (2d)m, the major axis Y thereof is four times the beam diameter (4d), the minimum distance Z from the mask central axis or the rotational center 73 of the mask to the aperture edge is equal to the beam diameter d, and the central axis 74 of the aperture is deviated a distance P from the mask center 73, even if the laser output optical axis is not aligned with the output mirror central axis, it is easy to output 99.97% of the laser beams oscillated in the basic mode, and almost all of the incoherent light is intercepted simply by mounting the mask 7 on the outer periphery of the mirror holder 121 and positioning the laser output optical axis with the aperture by means of rotational adjustment of the mask 7.

Since the aperture size is slightly larger than the laser beam, all the incoherent light would not be intercepted. But compared to the case without the mask, the output of incoherent light is remarkably inhibited. If complete interception of incoherent light were attempted, it would push up the manufacturing cost and would not be practically effective. This invention attempts instead to provide a technology of practical value that enables inexpensive manufacture of laser tubes which can effectively output laser beams permitting only minimum output of incoherent light.

An embodiment of the gas laser tube mentioned above has, for example, the laser beam diameter d of 0.65 mm on the output mirror having a diameter of 10 mm. Preferably, the minor axis X of the mask aperture 72 is X=2×0.65=1.3 mm, the major axis Y is Y=4×0.65=2.6 mm, the minimum distance Z between the mask central axis 73 and the aperture edge is Z=0.65 mm, the distance P between the mask central axis 73 and the aperture central axis 74 is P=0.65 mm. As shown in the figures, it is most preferable to select the curvature radii on both sides of the elliptic aperture 72 to be equal to the laser beam diameter d.

Figure 3:
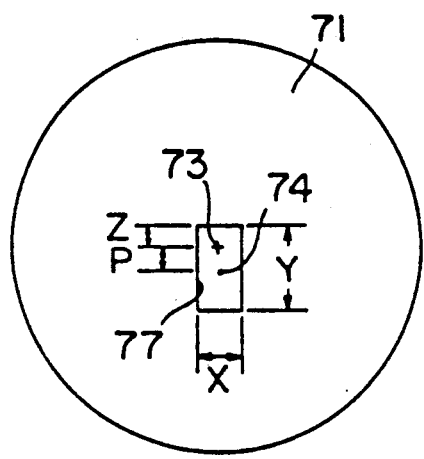
FIG. 3 is a bottom view of a cap-shaped mask of a second embodiment of this invention with different window shape.

The shape of the aperture of the mask 7 is not limited to that shown in the above embodiment. As shown in FIG. 3, the aperture 77 on the mask bottom 71 may be rectangular. In other words, the object of this invention can be achieved if the diemsnions of the shorter side X and the longer side Y of the rectangle 77, and the minimum distance Z between the mask central axis 73 (central rotational axis) and the aperture circumference edge are selected in the similar manner to the above, and if the central axis 74 of the aperture and the mask central axis 73 are deviated in position. Compared to the first embodiment which has an elliptical aperture, it has only slightly more output of incoherent light through small corners of the rectangle.

Figure 4:
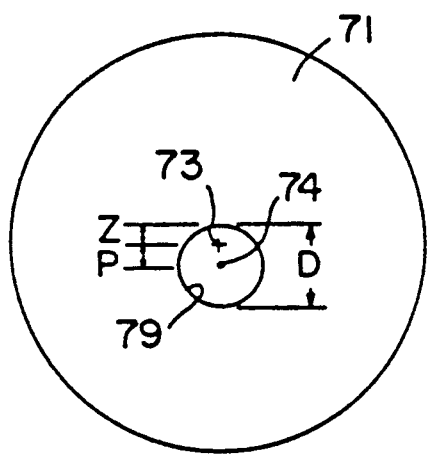
FIG. 4 is a bottom view of the cap-shaped mask of the third embodiment of this invention which has another shape of a window.

The aperture 79 on a mask bottom 71 may be shaped as a circle as shown in FIG. 4. In this case, it is also preferable to select the diameter D of this circle to be about four times as large as the laser beam diameter d on the output mirror. The distance P between the central axis 74 of the circular aperture and the mask central axis 73 may be substantially equal to the laser beam diameter d, and the minimum distance between the mask central axis 73 and the opening edge may be substantially equal to the laser beam diameter d also. Although the inhibiting effect against the output of incoherent light is slightly less in the third embodiment than the above-mentioned two embodiments, the size of the aperture in each embodiment is drastically smaller than the whole area of the output mirror, and moreover the center of the aperture is deviated to deal with the laser optical axis deviation to attain a relatively high efficiency in inhibition of incoherent light output.

Among the three kind of shapes of the aperture shown above, it is quite obvious that the shape of the aperture 72 in FIG. 2B is most effective in inhibiting the output of incoherent beam. The dimensions X, Y and Z may be appropriately determined in accordance with the laser beam diameter d on the output mirror, but it is still preferable to set the dimensions within the range expressed below. The lower limits of the dimensions are determined in order to output almost all of the laser beams as mentioned above. The upper limits, on the other hand, are determined in order to prevent the reduction of the inhibiting effect of incoherent beam output, and are less strictly determined than the lower limits. The target is set to intercept 80% or more of the incoherent light outputted from the output mirror surface.

$$2d \leq X \leq 4d$$

$$4d \leq Y \leq 5d$$

$$d \leq Z \leq 2d$$

$$d/2 \leq P \leq 1.5d$$

Figure 5:
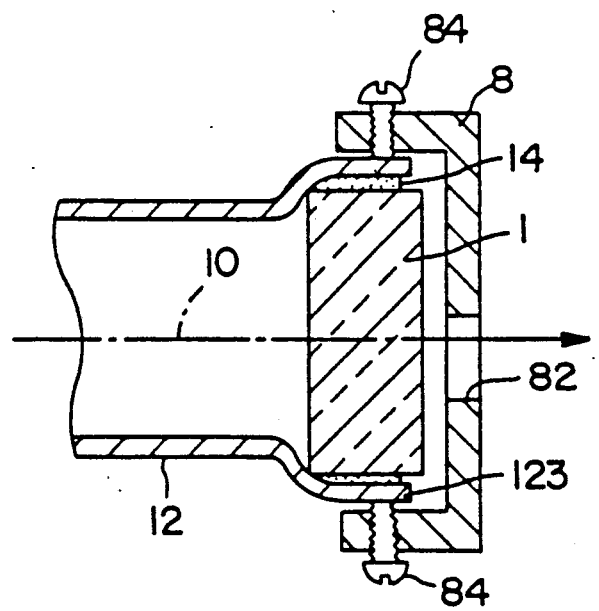
FIG. 5 is a partially enlarged sectional view of a output mirror portion in order to show another embodiment of the mounting structure of the cap-shaped mask.

Although the mask material is silicone rubber in the above embodiment, it may be made of other rubber-like materials. It is further preferable to give the heat resistant property to the mask, if necessary. The mask material is not necessarily elastic. The mask may be naturally made of rigid opaque plastic or metal. The bottom of the mask may contact the output mirror exterior surface, but as the mask is made to rotate, it is preferable to provide a small space therebetween as shown in FIG. 2A. When the cap-shaped mask is made of metal or plastic, the mask may be firmly engaged with the mirror holder on the outer circumference 123 by providing screws 84 in screw taps at several positions on the sides of the mask 8 which has an aperture 82 as shown in FIG. 5. They may be engaged with each other by means of an O-ring instead of screws.

As described in the foreoging statement, the gas laser tube according to this invention achieves quite practical, effective and inexpensive operational effects and it can effectively inhibit incoherent light beam output, and at the same time can take out almost all the output of the laser beams simply by rotatably attaching a mask having an eccentric window on the output mirror portion of the laser tube. Although an argon laser tube of which laser capillary forms a part of the outer envelope is shown in the embodiments above, this invention is applicable to popularly known He-Ne laser tubes of which laser capillary tubes are provided within the envelopes. The effect of this invention is further enhanced when applied to a ga laser tube having a more complex structure with a larger number of component parts to be assembled.

what is claimed is:

1. A gas laser tube comprising:
an outer envelope having a pair of mirrors at both ends thereof to form an optical resonator, one of the mirrors being an output mirror which has an outer surface and through which a laser beam having a diameter and an optical axis is emitted;
a discharge gas sealed within the outer envelope,
a pair of electrodes disposed within the outer envelope for exciting the discharge gas;
a laser capillary tube extending between the electrodes; and
a mask rotatably mounted around the outer surface of the output mirror, said mask having a central axis, a surface substantially perpendicular to the optical axis of the laser beam, and a window in the surface for passing the laser beam therethrough, wherein the window has an edge, a central axis which is positioned away from the central axis of the mask, a maximum dimension which is five times the diameter of the laser beam at said output mirror, and a minimum dimension between the central axis of the mask and the edge of the window which is equal to the diameter of the laser beam, thereby reducing the amount of incoherent light output by the gas laser tube and enhancing the quality of the emitted beam.

2. The gas laser tube as claimed in claim 1, wherein the mask is in the form of a cap including the surface having the window and a side wall surrounding the surface.

3. The gas laser tube as claimed in claim 2, wherein the mask comprises an elastic material and the inner face of the side wall is arranged around the outer circumference of the output mirror.

4. The gas laser tube as claimed in claim 1, wherein the window has a generally elliptical shape.

5. The gas laser tube as claimed in claim 3, wherein the minor axis of the elliptical window is two times the beam diameter while the major axis thereof is four times the beam diameter, and the distance between the central axis of the mask and the edge of the window is equal to the beam diameter.

6. In a gas laser tube having an optical resonator including an output mirror and a supporting cylinder for the output mirror, the supporting cylinder having a outer circumference, the improvement comprising:
a cap-shaped mask mounted around the outer circumference of the supporting cylinder, wherein the mask includes a central axis, an aperture which has an elliptical shape for passing a laser beam having an optical axis therethrough, and a center which is deviated from the central axis of the mask and wherein the mask is rotated around the central axis of the mask so that the center of the aperture comes closest to the optical axis of the laser beam, whereby most of the coherent light of said laser beam and only a part of the incoherent light are transmitted through the aperture to enhance the quality of the emitted beam.

* * * * *